UNITED STATES PATENT OFFICE.

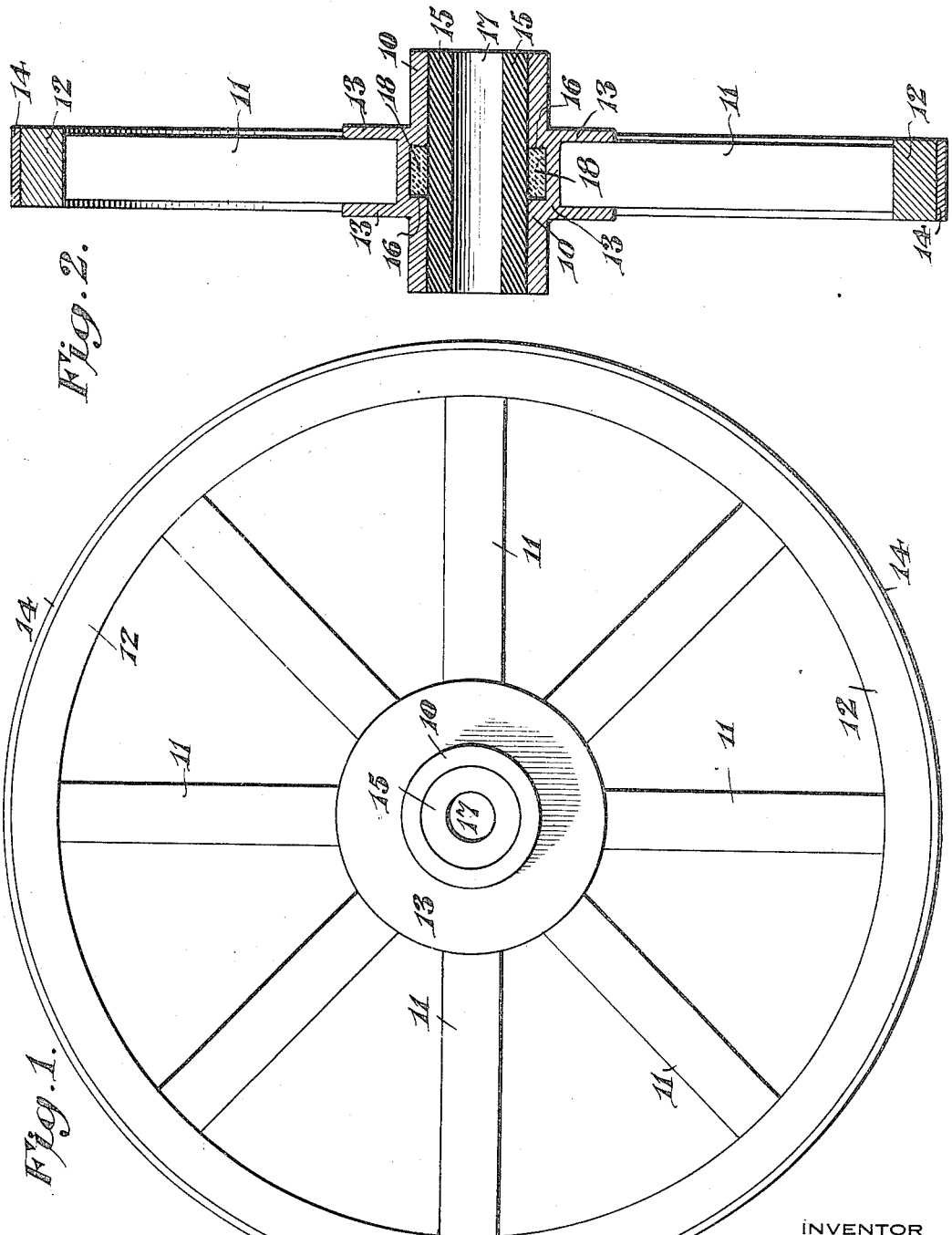

HENRY J. HEIDER, OF CARROLL, IOWA, ASSIGNOR TO HEIDER MANUFACTURING COMPANY, OF CARROLL, IOWA.

NON-OILING WHEEL.

1,280,460.   Specification of Letters Patent.   Patented Oct. 1, 1918.

Application filed April 16, 1918. Serial No. 228,933.

*To all whom it may concern:*

Be it known that I, HENRY J. HEIDER, a citizen of the United States, residing at Carroll, in the county of Carroll and State of Iowa, have invented a new and useful Non-Oiling Wheel, of which the following is a specification.

This invention relates to devices for lubricating wheels, and particularly to a hub construction which provides for the permanent lubrication of the axle of a wheel.

The principal object of this invention is to provide a lubricating construction which will last as long as the wheel itself, and which will render the wheel practically noiseless in its rotation.

The specific object of this invention is to provide for permanent lubrication of the wheels of children's wagons and vehicles at a low cost.

In carrying out this invention, an oil-soaked wooden bushing is set within the hub of the wheel, and an annular recess provided inside the hub and surrounding the oil-soaked bushing. This annular recess is filled with a hard grease. As fast as the oil evaporates, or is worn from the bushing, the hard grease renews the same, acting much as a supply of oil to a wick. Thus the bushing is kept constantly in an oil-soaked condition, and being of wood, renders nearly noiseless the rotation of the wheel on its axle.

As stated the present construction is designed particularly for use in children's wagons, often called "coaster" wagons. The wheels of such wagons are subject to considerable neglect by the owners, it being the rule rather than the exception to use the wagon as long as it will run without applying oil to the wheels. Moreover, it is common to allow such wagons to stand out all night in the rain and to abuse them in various other ways. A vehicle made with wheels conforming to this invention will give good service under such treatment and will run easily, have a long life, and turn almost without noise. Moreover, it will not be expensive to construct.

To better understand my invention, a drawing, illustrating one embodiment of my invention, accompanies and forms a part of this specification.

In the drawing—

Figure 1 is a side view of a wheel constructed in accordance with my invention; and Fig. 2 is a central cross-sectional view of the same.

Referring particularly to the drawing, the numeral 10 designates the hub of the wheel, 11 the spokes and 12 the rim. The usual tire 14 is secured to the rim. As shown at 13, the hub 10 midway between its ends, is provided with an annular shoulder which receives the inner ends of the spokes, and also provides room within the hub for an annular recess or reservoir 16, normally containing hard grease 18.

A bushing 15 consisting of a hollow cylinder of wood or similar porous material completely saturated with oil, is forced into the hub until its ends are flush with the ends of the hub. The axle (not shown) of course fits in the bearing 17 of the hub, and hence turns in an oil-soaked wooden bearing which itself is kept soaked with oil. A washer (not shown) or its equivalent, should be placed on each end of the hub to prevent the bushing from slipping out, in the event that it becomes loose.

While the drawing illustrates the reservoir 16 as having straight or vertical sides, I do not wish to be limited thereto, because it is an advantage in casting the hubs to make the sides slanting so that the core may be removed intact.

When constructing the wheel, the annular reservoir inside the hub is first packed with hard grease. Then the oil-saturated bushing is forced into the hub by pressure, but is not secured in the hub by any other means than friction and the washers referred to above. The hard grease is thus left in permanent contact with the bushing, and being in contact, acts to the saturated bushing just as a supply of oil acts on a lamp wick. As long as the bushing is in the hub, no matter how much worn its bearing surface becomes, the hard grease supplies the necessary lubricant and keeps the bearing practically bathed with oil.

Preferably the bushing is constructed from selected hard maple, but any other hard wood or other porous material might be used. The rest of the wheel may be constructed from any desired materials.

It is to be clearly understood that while the above-described construction is intended especially for use in children's vehicles, it is my privilege to employ it in making many kinds of wheels. It is to be further understood that the foregoing description is illustrative only, and that various changes within the appended claims may be made in details without departing from the spirit of my invention.

What is claimed is—

1. In a wheel hub, a porous bushing saturated with oil, said bushing being held within the hub, and a reservoir for lubricant surrounding the bushing and holding the lubricant in contact with the same.

2. In a wheel hub, an oil-treated wooden bushing, cylindrical in form, said bushing being forced within the hub under pressure and retained therein by friction, and an annular lubricant reservoir formed within the hub, and filled with lubricant in contact with said bushing at an intermediate point of its length.

3. In a wheel hub, a wooden bushing saturated with oil, said bushing being held within the hub, an annular lubricant reservoir formed within the hub and surrounding the bushing, and lubricant packed in said reservoir, and of greater consistency than the oil with which the bushing is saturated.

4. In a wheel hub, a wooden bushing saturated with lubricant, said bushing being held within the hub, an annular shoulder formed on the outer surface of said hub, an annular lubricant reservoir formed on the inside of said hub and extending to the base of the shoulder, said reservoir having a width less than that of the shoulder and receiving lubricant which is held in contact with said bushing.

In testimony, that I claim the foregoing as my own, I have hereto affixed my signature in the presence of two witnesses.

HENRY J. HEIDER.

Witnesses:
  A. E. BRYAN,
  BEATRICE VALLIE.